(12) United States Patent
Kluttz et al.

(10) Patent No.: US 7,576,148 B2
(45) Date of Patent: Aug. 18, 2009

(54) BLOWN ASPHALT COMPOSITIONS

(75) Inventors: Robert Q. Kluttz, Houston, TX (US); Harriet J. S. Kendrick, Cypress, TX (US); Keith E. Stephens, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 365 days.

(21) Appl. No.: 11/270,079

(22) Filed: Nov. 9, 2005

(65) Prior Publication Data

US 2007/0105986 A1 May 10, 2007

(51) Int. Cl.
*C08L 95/00* (2006.01)

(52) U.S. Cl. ...................................... 524/68
(58) Field of Classification Search .................. 524/68
See application file for complete search history.

(56) References Cited

U.S. PATENT DOCUMENTS

| | | | |
|---|---|---|---|
| RE27,145 E | 6/1971 | Jones | |
| 3,595,942 A | 7/1971 | Wald et al. | |
| 3,634,549 A | 1/1972 | Shaw et al. | |
| 3,670,054 A | 6/1972 | De La Mare et al. | |
| 3,700,633 A | 10/1972 | Wald et al. | |
| 3,985,830 A | 10/1976 | Fetters et al. | |
| 4,391,949 A | 7/1983 | St Clair | |
| 4,405,680 A | 9/1983 | Hansen | |
| 4,444,953 A | 4/1984 | St Clair | |
| 4,588,634 A | 5/1986 | Pagen et al. | |
| 4,994,508 A | 2/1991 | Shiraki et al. | |
| 5,190,998 A | 3/1993 | Fisher | |
| H1250 H | 11/1993 | Gilmore et al. | |
| 5,336,705 A * | 8/1994 | Gorbaty et al. | 524/68 |
| 5,342,866 A * | 8/1994 | Trumbore et al. | 524/68 |
| 5,488,807 A | 2/1996 | Terrenzio et al. | |
| 5,777,031 A | 7/1998 | Djiauw et al. | |
| 5,798,401 A | 8/1998 | Korenstra et al. | |
| 5,830,925 A | 11/1998 | Chion et al. | |
| 5,902,683 A | 5/1999 | Sieloff | |
| 5,929,144 A | 7/1999 | Fields | |
| 5,939,474 A | 8/1999 | Gooswilligen et al. | |
| 5,973,037 A | 10/1999 | Fields | |
| 5,990,206 A | 11/1999 | Tanaka et al. | |
| 6,027,557 A | 2/2000 | Hayner | |
| 6,031,029 A | 2/2000 | Baumgardner et al. | |
| 6,060,542 A | 5/2000 | Gooswilligen et al. | |
| 6,117,926 A | 9/2000 | Engber et al. | |
| 6,120,913 A | 9/2000 | Kluttz et al. | |
| 6,174,939 B1 * | 1/2001 | Liang | 524/59 |
| 6,228,909 B1 | 5/2001 | Baumgardner et al. | |
| 6,418,692 B1 | 7/2002 | Freshwater et al. | |
| 6,646,036 B2 | 11/2003 | Fujiwara et al. | |
| 6,851,240 B2 | 2/2005 | Peng et al. | |
| 6,852,806 B2 | 2/2005 | Sasagawa et al. | |
| 7,374,659 B1 * | 5/2008 | Burris et al. | 208/22 |
| 2005/0107521 A1 | 5/2005 | Sasagawa et al. | |

FOREIGN PATENT DOCUMENTS

CA 716 645 8/1965

* cited by examiner

*Primary Examiner*—Peter Szekely
(74) *Attorney, Agent, or Firm*—Gregory N. Clements; Michael A. Masse

(57) ABSTRACT

A process for preparing compatible, selectively hydrogenated block copolymer-modified bituminous compositions comprising blowing a mixture of the block copolymer and bitumen with an oxidizing gas at temperatures of at least 375° C. for at least 75 minutes. The modifying polymer is a selectively hydrogenated styrenic block copolymer and no blowing catalyst is required. Stable bituminous compositions comprising 6 to 25 parts by weight of block copolymer per 100 parts of asphalt are also provided as well as their application as roofing shingles.

22 Claims, 3 Drawing Sheets

BLOWN ASPHALT COMPOSITIONS

FIELD OF THE INVENTION

The invention relates to a process for making a compatible, block copolymer-modified bituminous composition. The invention further relates to bituminous compositions comprising selectively hydrogenated block copolymers and their use in roofing shingles.

BACKGROUND

In roofing shingle applications, there is a need for increased flexibility to improve wind damage resistance and increased impact resistance to improve hail damage resistance. Previous improvements involving styrenic block copolymer/asphalt mixtures have made advances in this area. U.S. Pat. No. 4,405,680 taught polymer modified shingles where a blend of an unblown, compatible asphalt and an SBS styrenic block copolymer was made. The glass mat substrate of the shingle was impregnated with this blend. However, in order to achieve the required durability, the shingle was coated with a relatively high penetration value (PEN), blown asphalt.

In the blowing process, asphalt is oxidized by passing an oxygen-containing gas through the asphalt. This process serves to increase the asphaltene content, introduce ester functionality, and increase molecular weight. These are all factors which lead to incompatibility with styrenic block copolymers. Thus, while the blowing operation does increase the stiffness and softening point of the asphalt, it also makes the asphalt less suitable for blending with styrenic block copolymers. Blends of styrenic block copolymers and blown asphalt generally have poor storage stability with the block copolymer separating from the blend over time. Further, the conditions for blowing are harsh in that high temperatures and highly oxidative conditions are employed. This leads to severe degradation of SBS-type polymers.

However, methods have been developed, as taught in U.S. Pat. Nos. 5,939,474 and 6,060,542, in which blends of styrenic block copolymers and asphalt are blown. These methods require a blowing catalyst in order to conduct the blowing operation at conditions suitable for block copolymers. Even with mild conditions and blowing catalysts, though, hydrogenated SEBS-type block copolymers have been found to be unsuitable, as taught in U.S. Pat. No. 5,342,866.

A need yet exists for stable high polymer content blown polymer modified bituminous compositions and processes for preparing them which do not require blowing catalysts. Such an improvement would yield shingles with excellent in-use performance and excellent resistance to mechanical damage such as scuffing during roof installation and repair using simple and economical processes. The present invention provides a method and a material suitable for block copolymer modified shingle manufacture comprising a blown mixture of asphalt and an SEBS-type block copolymer which has a high PEN value and maintains its flexibility and impact resistance.

SUMMARY OF THE INVENTION

The present invention relates to a process for preparing a bituminous composition comprising
  i) heating 100 parts by weight bitumen to at least 375° F.,
  ii) adding from 6 to 25 parts by weight of a selectively hydrogenated block copolymer having at least one A block of a polymerized monoalkenyl arene and at least one B block of a polymerized and hydrogenated conjugated diene,
  iii) stirring the mixture using a low shear mixer, and
  iv) blowing an oxygen-containing gas through the mixture at a gas flow rate of at least 5 liters per minute (lpm) for a time of at least 75 minutes in the absence of a blowing catalyst.

Another embodiment of the present invention is a stable, polymer-modified bituminous composition made by the inventive process having a softening point of at least 190° F.

A further embodiment of the present invention is a roofing shingle comprising the stable, polymer-modified bituminous composition made by the inventive.

DETAILED DESCRIPTION OF THE INVENTION

Figure 1:
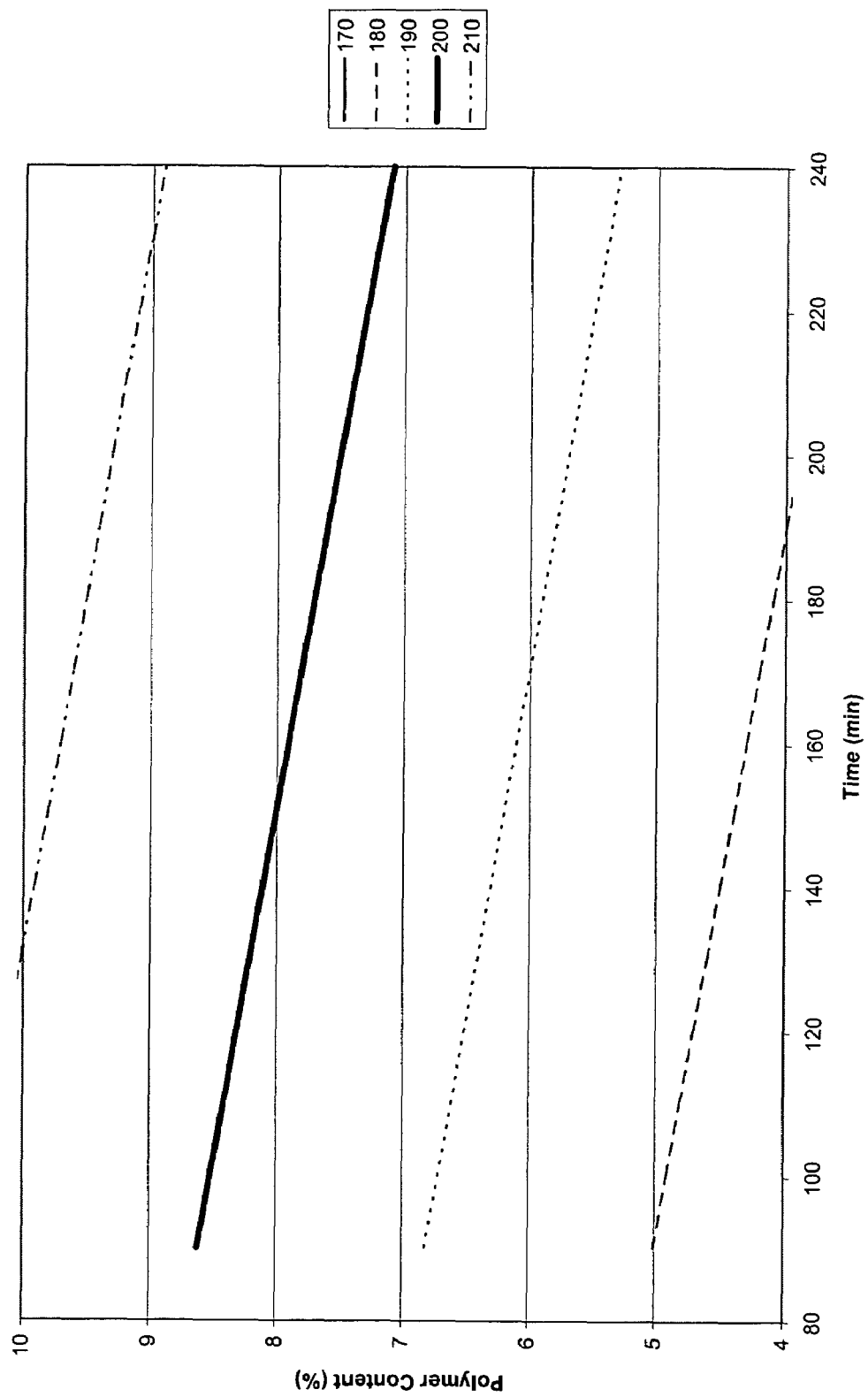
FIG. 1 shows a predictive contour plot of softening point (° F.) at various polymer contents and blowing times. The prediction is for the examples of the invention blown at 500° F. and an air flow of 14 lpm.

In the process of the present invention, bitumen (alternately. referred to as asphalt) is heated to at least 375° F. Below this temperature the bitumen is too viscous to process and does not easily incorporate added block copolymer. In a preferred embodiment the bitumen is heated to a temperature from 375° F. to 525° F.

From 6 to 25 parts by weight of a block copolymer are added to the heated bitumen on the basis of 100 parts by weight of bitumen. Only low shear mixing is required. Surprisingly, it has been found that the action of the blowing leads to facile incorporation of the relatively high molecular weight block copolymers. While high shear mixing could be used, it is not required to achieve the modified bituminous compositions. Typical low shear mixers are auger-type or impeller-type mixers. More preferred amounts of block copolymer are 7 to 15 parts by weight on the basis of 100 parts by weight of bitumen.

The present invention does not require the use of a blowing catalyst or any additive to enhance incorporation of the block copolymer. The process is blowing catalyst-free.

In the blowing process an oxygen-containing gas is forced through the bitumen-block copolymer mixture. The oxygen-containing gas is preferably air but can be any other gaseous mixture or pure oxygen. The degree of blowing achieved depends in one aspect upon the rate of gas flow. In one embodiment of the present invention the gas is air and the flow rate is at least 5 lpm per kg of the bitumen-block copolymer mixture. In a preferred embodiment the air flow rate is from 5 to 50 and in a most preferred embodiment from 5 to 25 lpm per kg of the bitumen-block copolymer mixture.

The degree of blowing further depends upon the time spent by the bitumen-block copolymer mixture at elevated temperature and under flow of oxygen-containing gas. In one embodiment of the present invention the blowing occurs for at least 75 minutes. In a preferred embodiment the blowing occurs for from 75 to 360 minutes. In a most preferred embodiment the blowing occurs for 75 to 240 minutes.

If either the temperature, gas flow rate, time or the combination of these effects is excessive then undesirable degradation of the block copolymer results. The conditions delimited by the present inventive process yields block copolymer modified bituminous compositions experiencing minimal degradation and advantageous properties for roofing shingle applications.

One of the advantageous properties of bituminous compositions made by the inventive process is the homogeneity of the mixture. In the context of the present invention, homogeneity means that the block copolymer is so finely dispersed in the bitumen that the mixture appears smooth and uniform. The block copolymer may be dissolved in the bitumen or may be held as a microscopically dispersed mixture, depending upon the temperature and degree of blowing. When the bituminous composition is not homogeneous it has a grainy or lumpy appearance. In extreme cases which are not desired in the present invention, the mixture can form separate layers or regions of block copolymer and bitumen.

One further advantageous property of bituminous compositions made by the inventive process is stability of the mixture. In the context of the present invention, stability means the maintenance of the state of homogeneity throughout the roofing shingle manufacturing process. When a block copolymer-modified bituminous composition is referred to as "compatible" it is meant that the composition possesses these characteristics of homogeneity and stability.

The mono alkenyl arene monomers of the selectively hydrogenated block copolymer can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Polymerization conditions to prepare the novel copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

Preparation of radial (branched) polymers requires a post-polymerization step called "coupling". In the above radial formula n is an integer of from 2 to about 30, preferably from about 2 to about 15, and most preferably from about 2 to about 4, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

The mono alkenyl arene blocks of the present invention range in molecular weight from 5,000 to 30,000. The preferred range is from 5,000 to 20,000 and the most preferred range is from 5,000 to 10,000. The total molecular weight of the block copolymer, whether linear or coupled, is from 50,000 to 300,000. The preferred range is from 60,000 to 200,000 and the most preferred range is from 70,000 to 100,000.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The mono alkenyl arene content of the present invention is from 15 to 50 wt %. The preferred range is from 20 to 40 wt % and the most preferred range is from 25 to 35 wt %.

One important aspect of the present invention is the microstructure of the block copolymer. The microstructure relevant to the present invention is an elevated amount of vinyl in the conjugated diene blocks. In the case of 1,3-butadiene, a vinyl configuration results from 1,2-addition during polymerization. In the case of isoprene, a vinyl configuration results from 3,4-addition during polymerization. The vinyl structure of other conjugated dienes can be understood as analogous to these two examples. The vinyl configuration can be achieved by the use of a microstructure control agent during polymerization of the diene. A typical agent is diethyl ether. See U.S. Pat. No. Re 27,145 and U.S. Pat. No. 5,777,031, the disclosure of which is hereby incorporated by reference. Any microstructure control agent known to those of ordinary skill in the art of preparing block copolymers to be useful can be used to prepare the block copolymers of the present invention.

In the practice of the present invention, the block copolymers are prepared so that they have from about 20 to about 80 mol % vinyl in the conjugated diene blocks prior to hydrogenation. In a preferred embodiment of the present invention the vinyl content is from 30 to 75 mol % and in a most preferred embodiment the vinyl content is from 35 to 70 mol %.

The preferred embodiment of the present invention comprises a hydrogenated block copolymer. The preferred hydrogenation is selective hydrogenation of the diene portions of the final block copolymer. Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634, 549; 3,670,054; 3,700,633; and Re. 27,145, the disclosures of which are incorporated herein by reference.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

The bituminous component, also known as asphalt, present in the bituminous compositions according to the present invention may be a naturally occurring bitumen or derived from petroleum. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphalt", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 300 units (equivalent to decimillimeters, dmm) at 25° C. In applications where the flexibility, tackiness or adhesion of the product is of high importance, such as in roofing shingle applications, fluxed bitumen having penetrations in the range of greater than 300 units at 25° C. are of particular use.

The polymer modifier is suitably present in the bituminous composition in an amount in the range of from 6 to 25 parts by weight on the basis of 100 parts by weight of bitumen. Incorporation of block copolymers causes a change of the bitumen character from viscous to visco-elastic. This change in properties generally occurs with polymer contents ranging from about 0.5% to about 8%. At higher polymer contents ranging to about 25% substantial increases in flexibility and elastic strength can be achieved. This is particularly interesting for roofing shingles, roofing felts, asphaltic adhesives and waterproofing membranes.

The bituminous composition may also, optionally, contain other ingredients such as may be required for the end-use envisaged. Thus fillers may be included, for example talc, calcium carbonate and carbon black, or other components including resins, oils, stabilizers or flame retardants may be incorporated. The content of such fillers and other components may be in the range of from 0 to as much as 99% by weight. of course, if advantageous, other polymer modifiers may also be included in the bituminous composition of the invention.

The penetration values of the bituminous composition of the present invention suitable for shingle manufacture are critical to determining shingle performance. Typical shingle-grade asphalt has a penetration less than 20 units at 25° C., a ring and ball softening point less than 200° F. and a viscosity less than 1500 cps at 400° F. Typical shingle-grade asphalts with penetration values less than 20 units are stiff and susceptible to fracture. As a result they are likely to fail in tests performed according to UL 2218 specifications. Softer asphalts or modified asphalts can be used which have penetration values greater than 30 units at 25° C. However, these are generally too soft to be practical and are likely to suffer scuffing damage during application. In the present invention the bituminous composition comprising a block copolymer is controllably blown to achieve a preferred penetration from 20 to 30 units at 25° C. and a softening point of at least 190° F.

The roofing shingles of the present invention comprise from 30 to 50 wt % of the polymer-modified bituminous composition, from 50 to 65 wt % of an inert filler, and from 1 to 10 wt % of a non-woven glass mat. In the manufacture process the filler is added to the bituminous composition and this mixture is used to coat the non-woven glass mat. The shingle surface is further coated with inert granules to provide durability, walk-on-ability, an attractive surface finish, and to prevent blocking during storage and shipping.

EXAMPLES

Test Procedures

Penetration of the neat bitumen and polymer modified bitumen was measured according to ASTM D 5. Ring and ball softening point of the polymer-modified bitumen was measured according to ASTM D 36. Viscosities were measured using a Brookfield viscometer.

Materials

SEBS was a linear styrene—ethylene/butylene—styrene block copolymer having a total molecular weight of 80,000 and a polystyrene content of 30%.

SBS was a coupled, linear styrene—butadiene—styrene block copolymer having a total molecular weight of 120,000, a coupling efficiency of 84%, and a polystyrene content of 28%.

The asphalt was Hunt AC5. Unmodified, AC5 has a viscosity of 500 poise at 140° F., a PEN of approximately 150 units, and a ring and ball softening point in the range of 40 to 50° F.

Example 1 and Comparative Examples C1 and C2

900 grams of asphalt was heated to 400° F. Polymer (SEBS or SBS) was then added at 7 wt % and manually stirred using a paddle. The polymer/asphalt mixture was then added to a 2 gallon blow still preheated to 500° F. The mixture temperature was stabilized at 500° F. and air sparging was begun at 20 liters per minute (lpm). The mixture was stirred using an air-driven, low shear impeller while the sparging continued at 500° F. for 120 minutes. The polymer modified asphalt was then drained from the still. In both the case of the inventive example 1 and the comparative example C1 the resulting blend was homogeneous and the block copolymer was completely dispersed in the asphalt. Table 1 shows the composition and processing conditions. Table 2 shows the resulting physical properties of the bituminous composition.

Similar softening points were achieved for both example 1 and comparative example C1. However, the pen of the SBS sample is much too low for good impact resistance and as such is unsuitable for roofing shingles. Analysis by GPC showed that the SBS polymer was completely degraded by the blowing process. In contrast, GPC analysis of the samples containing SEBS polymer showed minimal degradation of the block copolymer. The blowing process incorporated the selectively hydrogenated polymer under conditions of only mild mechanical mixing to form a homogeneous bituminous composition with properties suitable for roofing shingles.

TABLE 1

| Example | Polymer | Temp °F. | Time min | polymer content, wt % | Air flow, lpm |
|---|---|---|---|---|---|
| 1 | SEBS | 500 | 120 | 7 | 20 |
| C1 | SBS | 500 | 120 | 7 | 20 |
| C2 | none | 500 | 210 | 0 | 20 |

TABLE 2

| Sample | Pen, units | R&B, °F. | Vis at 400° F., cps | Vis at 425° F., cps | Vis at 475° F., cps |
|---|---|---|---|---|---|
| 1 | 26 | 226 | 1390 | 932 | 445 |
| C1 | 8 | 220 | 1370 | 748 | 290 |
| C2 | <12 | 220 | — | — | — |

Examples 2-7 and Comparative Examples C3-C6

Block copolymer modified asphalt blends were made according to the method of Example 1 with the variations noted in Table 3. In all cases the resulting blend was homogeneous with the polymer completely dispersed in the asphalt.

TABLE 3

| Example | Temp, °F. | Time, min | SEBS content, wt % | Air flow, lpm |
|---|---|---|---|---|
| 2 | 525 | 90 | 10 | 8 |
| 3 | 525 | 210 | 10 | 20 |
| 4 | 475 | 90 | 10 | 20 |
| 5 | 475 | 210 | 10 | 8 |
| 6 | 500 | 150 | 7 | 14 |
| 7 | 500 | 150 | 7 | 14 |
| C3 | 475 | 90 | 4 | 8 |
| C4 | 475 | 210 | 4 | 20 |
| C5 | 525 | 90 | 4 | 20 |
| C6 | 525 | 210 | 4 | 8 |

Figure 2:
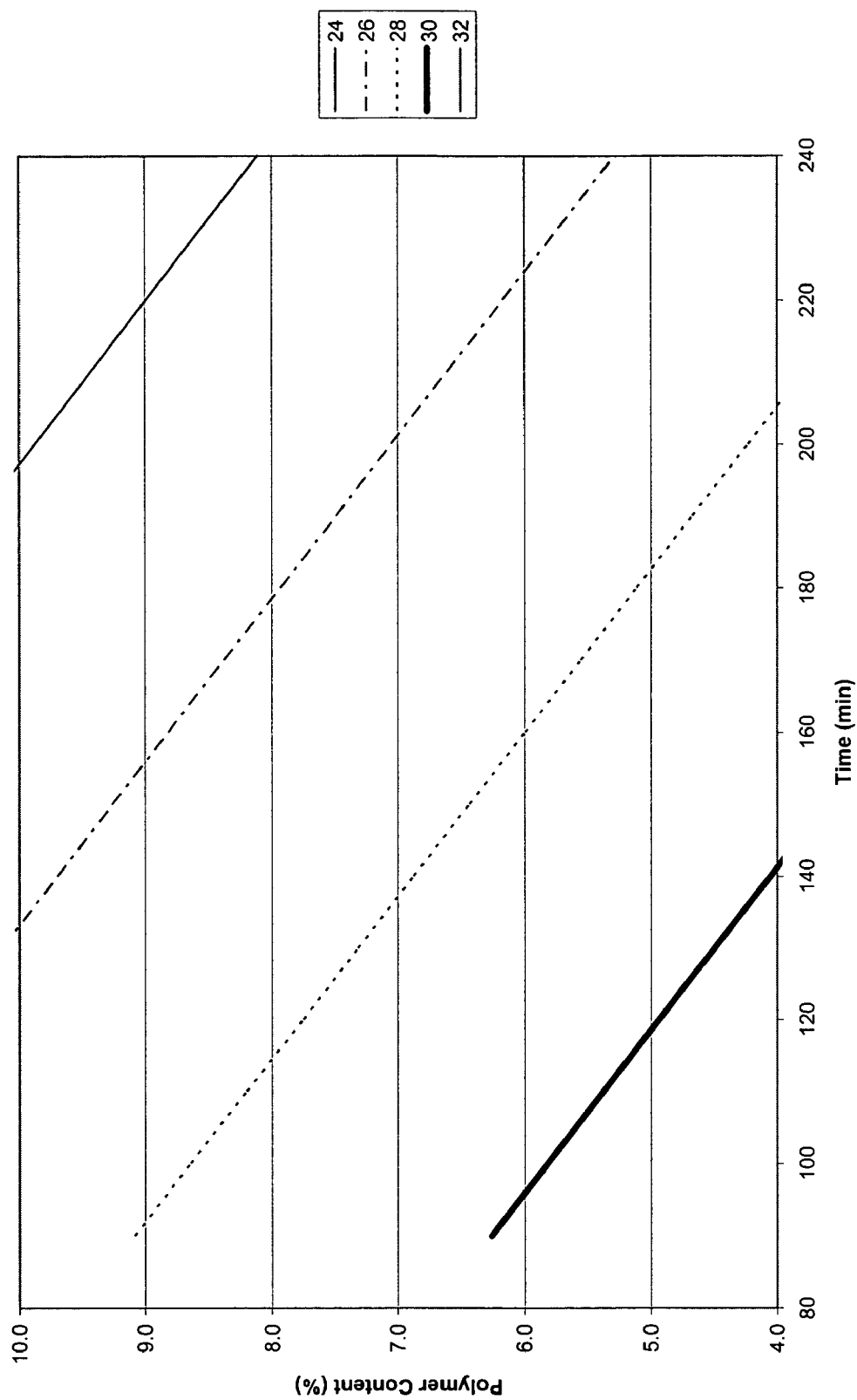
FIG. 2 shows a predictive contour plot of penetration (units) at various polymer contents and blowing times. The prediction is for the examples of the invention blown at 500° F. and an air flow of 14 lpm.
Figure 3:
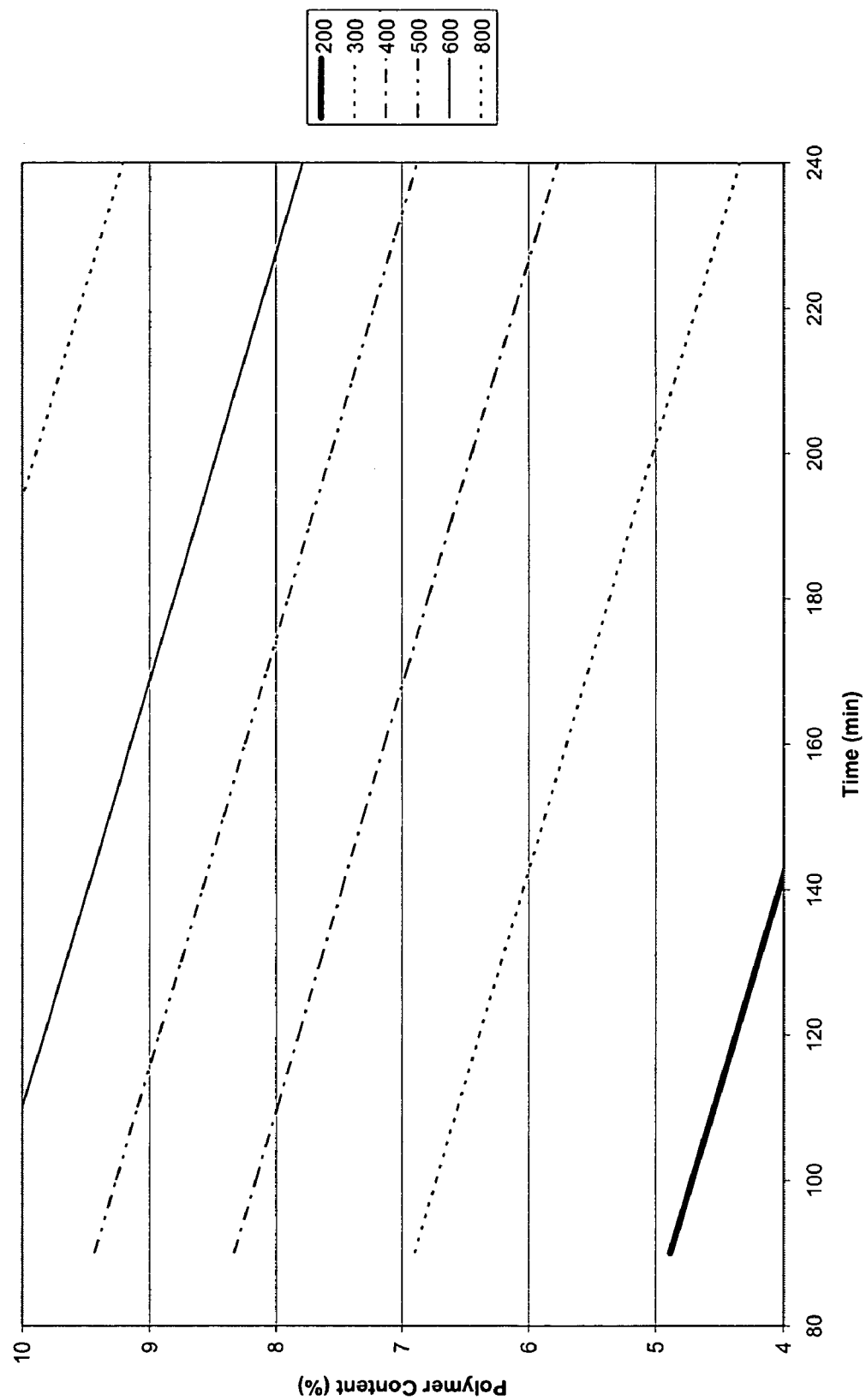
FIG. 3 shows a predictive contour plot of viscosity (cps) at 400° F. at various polymer contents and blowing times. The prediction is for the examples of the invention blown at 500° F. and an air flow of 14 lpm.

The series of experiments in Table 3 represent a partial factorial scientific design. The resulting physical properties are listed in Table 4. Simple linear regressions having an R square correlation of over 90% were obtained for correlations of penetration, softening point and viscosity. FIGS. 1, 2 and 3 show the predictive contour plots obtained.

The inventive examples showed that polymer contents greater than 4 wt % were required in order to make suitable block copolymer modified compositions having softening points of at least 190° F. These examples of the invention had penetrations in the range of 22 to 29 units at 25° C. and viscosities in the range of 390 to 1250 cps at 400° F.

TABLE 4

| Sample | Pen, units | R&B, °F. | Vis at 400° F., cps | Vis at 440° F., cps | Vis at 480° F., cps |
|---|---|---|---|---|---|
| 2 | 27 | 205 | 578 | 315 | 197 |
| 3 | 22 | 213 | 1250 | 625 | 360 |
| 4 | 27 | 212 | 578 | 330 | 197 |
| 5 | 25 | 211 | 427 | 230 | 138 |
| 6 | 29 | 203 | 573 | 317 | 188 |
| 7 | 28 | 192 | 390 | 215 | 130 |
| C3 | 42 | 168 | 110 | 65 | 40 |
| C4 | 26 | 189 | 340 | 183 | 105 |
| C5 | 21 | 176 | 190 | 105 | 65 |
| C6 | 29 | 175 | 200 | 112 | 68 |

Examples

Impact Resistance

Block copolymer modified asphalt blends were made according to the method of Example 1. The impact resistance of the blends were measured according to ASTM D 5420: 3 mm plaques were poured from molten blends, the samples were allowed to cool to room temperature, specimen disks were cut, impact was tested using a 1.2 lb dart, and the height required to shatter the specimen was recorded. Table 5 presents the results. The control sample containing no polymer modifier (C2) failed at an impact height of 3 inches. Addition of SEBS according to the inventive process yielded impact heights as great as 40 inches.

TABLE 5

| Sample | Polymer content, wt % | Impact height, in. |
|---|---|---|
| C2 | 0 | 3 |
| C5 | 4 | 25 |
| 6 | 7 | 15 |
| 3 | 10 | 40 |

We claim:

1. A process for preparing a bituminous composition comprising
   i) heating 100 parts by weight bitumen to at least 375° F.,
   ii) adding from 6 to 25 parts by weight of a selectively hydrogenated block copolymer having at least one A block of a polymerized monoalkenyl arene and at least one B block of a polymerized and hydrogenated conjugated diene,
   iii) stirring the mixture, and
   iv) blowing an oxygen-containing gas through the mixture at a gas flow rate of at least 5 lpm per kg of the bituminous composition for a time of at least 75 minutes in the absence of a blowing catalyst.

2. The process of claim 1 wherein the selectively hydrogenated block copolymer has the general formula S-EB-S or (S-EB)nX where S is a styrene block, EB is a hydrogenated butadiene block, X is the residue of a coupling agent and n is from 2 to 8.

3. The process of claim 2 wherein the styrene block has a weight average molecular weight from 5,000 to 30,000, and the total molecular weight of the block copolymer is from 50,000 to 300,000.

4. The process of claim 3 wherein the styrene content of the block copolymer is from 20 to 40 wt %.

5. The process of claim 2 wherein the EB block has a vinyl content from 20 to 80 mol % prior to hydrogenation.

6. The process of claim 1 wherein the oxygen-containing gas is air.

7. The process of claim 1 wherein the resulting bituminous composition has a softening point of at least 190° F.

8. The process of claim 1 wherein the resulting bituminous composition has a PEN value from 20 to 30 units at 25° C.

9. The process of claim 1 wherein the resulting bituminous composition has a Brookfield viscosity from 200 to 1400 cps at 400° F.

10. The process of claim 1 wherein 7 to 15 parts by weight of a selectively hydrogenated block copolymer is added in step ii) for each 100 parts by weight of bitumen.

11. A stable, polymer-modified bituminous composition made by the process comprising
   i) heating 100 parts by weight bitumen to at least 375° F.,
   ii) adding from 6 to 25 parts by weight of a selectively hydrogenated block copolymer having at least one A block of a polymerized monoalkenyl arene and at least one B block of a polymerized and hydrogenated conjugated diene,
   iii) stirring the mixture, and
   iv) blowing an oxygen-containing gas through the mixture at a gas flow rate of at least 5 lpm per kg of the bituminous composition for a time of at least 75 minutes in the absence of a blowing catalyst having a softening point of at least 190° F.

12. The bituminous composition of claim 11 wherein the selectively hydrogenated block copolymer has the general formula S-EB-S or (S-EB)nX where S is a styrene block, EB is a hydrogenated butadiene block, X is the residue of a coupling agent and n is from 2 to 8.

13. The bituminous composition of claim 12 wherein the styrene block has a weight average molecular weight from 5,000 to 30,000, and the total molecular weight of the block copolymer is from 50,000 to 300,000.

14. The bituminous composition of claim 13 wherein the styrene content of the block copolymer is from 20 to 40 wt %.

15. The bituminous composition of claim 11 wherein the EB block has a vinyl content from 20 to 80 mol % prior to hydrogenation.

16. The bituminous composition of claim 11 having PEN value from 20 to 30 units at 25° C.

17. The bituminous composition of claim 11 having a viscosity from 200 to 1400 cps at 400° F.

18. The bituminous composition of claim 11 having a ring and bail softening point of at least 200° F.

19. A roofing shingle comprising the bituminous composition of claim 11 and a non-woven glass mat.

20. The roofing shingle of claim 19 wherein the bituminous composition comprises from 30 to 50 wt % of the total shingle weight.

21. The roofing shingle of claim 19 wherein the selectively hydrogenated block copolymer has the general formula S-EB-S or (S-EB)nX where S is a styrene block, EB is a hydrogenated butadiene block, X is the residue of a coupling agent and n is from 2 to 8.

22. The roofing shingle of claim 21 wherein the styrene block has a weight average molecular weight from 5,000 to 30,000, the total molecular weight of the block copolymer is from 50,000 to 300,000, and the EB block has a vinyl content from 20 to 80 mol % prior to hydrogenation.

* * * * *